United States Patent
Yamamoto et al.

(10) Patent No.: US 10,593,948 B2
(45) Date of Patent: Mar. 17, 2020

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Chiyoda-ku, Tokyo (JP)

(72) Inventors: Norikazu Yamamoto, Tokyo (JP); Hiroshi Kobayashi, Tokyo (JP); Julien Delmas, Tokyo (JP); Kayoko Takizawa, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/762,241

(22) PCT Filed: Sep. 27, 2016

(86) PCT No.: PCT/JP2016/004360
§ 371 (c)(1),
(2) Date: Mar. 22, 2018

(87) PCT Pub. No.: WO2017/056489
PCT Pub. Date: Apr. 6, 2017

(65) Prior Publication Data
US 2018/0261845 A1 Sep. 13, 2018

(30) Foreign Application Priority Data

Sep. 30, 2015 (JP) .............................. 2015-194187
Sep. 30, 2015 (JP) .............................. 2015-194191

(51) Int. Cl.

| | |
|---|---|
| H01M 4/62 | (2006.01) |
| H01M 4/139 | (2010.01) |
| H01M 4/04 | (2006.01) |
| H01M 4/13 | (2010.01) |
| C08L 9/00 | (2006.01) |
| C08L 7/00 | (2006.01) |
| H01M 10/0525 | (2010.01) |
| C08L 25/10 | (2006.01) |
| H01M 4/02 | (2006.01) |

(52) U.S. Cl.
CPC .............. *H01M 4/622* (2013.01); *C08L 7/00* (2013.01); *C08L 9/00* (2013.01); *H01M 4/0404* (2013.01); *H01M 4/13* (2013.01); *H01M 4/139* (2013.01); *H01M 10/0525* (2013.01); *C08L 25/10* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

2013/0330622 A1    12/2013  Sasaki et al.
2016/0359156 A1*  12/2016  Ohkubo .................. H01M 4/13

FOREIGN PATENT DOCUMENTS

| JP | 2003100298 A | 4/2003 |
|---|---|---|
| JP | 2012204303 A | 10/2012 |
| WO | 2012115096 A1 | 8/2012 |

OTHER PUBLICATIONS

Feb. 15, 2019, the Extended European Search Report issued by the European Patent Office in the corresponding European Patent Application No. 16850668.1.
Apr. 3, 2018, International Preliminary Report on Patentability issued in the International Patent Application No. PCT/JP2016/004360.
Oct. 30, 2019, Communication pursuant to Article 94(3) EPC issued by the European Patent Office in the corresponding European Patent Application No. 16850668.1.

* cited by examiner

*Primary Examiner* — Sarah A. Slifka
(74) *Attorney, Agent, or Firm* — Kenja IP Law PC

(57) ABSTRACT

Provided is a binder composition for a non-aqueous secondary battery electrode capable of forming an electrode for a non-aqueous secondary battery that has excellent peel strength and can cause a non-aqueous secondary battery to display excellent cycle characteristics. The binder composition for a non-aqueous secondary battery electrode contains: a first particulate polymer including an aliphatic conjugated diene monomer unit in a proportion of more than 90 mass % and having a volume average particle diameter of at least 0.6 μm and not more than 2.5 μm; and a second particulate polymer including an aliphatic conjugated diene monomer unit in a proportion of at least 20 mass % and not more than 60 mass % and having a volume average particle diameter of at least 0.01 μm and not more than 0.5 μm.

9 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

This disclosure relates to a binder composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy-density, and the ability to be repeatedly charged and discharged, and are used in a wide range of applications. Consequently, in recent years, studies have been made to improve electrodes and other battery components with the aim of achieving even higher non-aqueous secondary battery performance.

An electrode for a secondary battery, such as a lithium ion secondary battery, normally includes a current collector and an electrode mixed material layer formed on the current collector. The electrode mixed material layer is formed, for example, by applying, onto the current collector, a slurry composition in which an electrode active material, a binder-containing binder composition, and so forth are dispersed in a dispersion medium, and drying the applied slurry composition.

In recent years, there have been attempts to improve binder compositions used in the formation of electrode mixed material layers in order to further improve secondary battery performance. In one specific example, it has been proposed that binding capacity between components (for example, an electrode active material) of an electrode mixed material layer and binding capacity between the electrode mixed material layer and a current collector (i.e., peel strength) can be increased, and secondary battery performance can be improved through use of a binder composition that contains two types of particulate polymers of differing particle diameters as a binder.

More specifically, PTL 1, for example, proposes that the peel strength of an electrode can be increased by using a binder obtained by mixing, in specific proportions, a particulate polymer for which the modal particle diameter of primary particles is at least 0.01 μm and less than 0.25 μm and a particulate polymer for which the modal particle diameter of primary particles is at least 0.25 μm and less than 3 μm.

CITATION LIST

Patent Literature

PTL 1: JP 2003-100298 A

SUMMARY

Technical Problem

However, there has been demand for further improvement of secondary battery performance in recent years, and there is also room for improvement over conventional binder compositions such as described above in terms of increasing the peel strength of an electrode that is produced using the binder composition while also further improving battery characteristics (for example, cycle characteristics) of a non-aqueous secondary battery that includes the electrode.

Accordingly, one objective of this disclosure is to provide a binder composition for a non-aqueous secondary battery electrode and a slurry composition for a non-aqueous secondary battery electrode that are capable of forming an electrode for a non-aqueous secondary battery that has excellent peel strength and can cause a non-aqueous secondary battery to display excellent cycle characteristics.

Another objective of this disclosure is to provide an electrode for a non-aqueous secondary battery that has excellent peel strength and can cause a non-aqueous secondary battery to display excellent cycle characteristics.

Yet another objective of this disclosure is to provide a non-aqueous secondary battery having excellent battery characteristics such as cycle characteristics.

Solution to Problem

The inventors conducted diligent investigation with the aim of solving the problems set forth above. Through this investigation, the inventors discovered that a binder composition for a non-aqueous secondary battery electrode that has excellent binding capacity and can cause a non-aqueous secondary battery to display excellent cycle characteristics can be obtained by using, in combination as a binder, a first particulate polymer having a specific make-up and average particle diameter, and a second particulate polymer having a specific make-up and average particle diameter. The inventors completed the present disclosure based on this discovery.

Specifically, this disclosure aims to advantageously solve the problems set forth above by disclosing a binder composition for a non-aqueous secondary battery electrode comprising: a first particulate polymer including an aliphatic conjugated diene monomer unit in a proportion of more than 90 mass % and having a volume average particle diameter of at least 0.6 μm and not more than 2.5 μm; and a second particulate polymer including an aliphatic conjugated diene monomer unit in a proportion of at least 20 mass % and not more than 60 mass % and having a volume average particle diameter of at least 0.01 μm and not more than 0.5 μm. Through inclusion of the first particulate polymer having a specific make-up and volume average particle diameter, and the second particulate polymer having a specific make-up and volume average particle diameter as set forth above, it is possible to form an electrode that has excellent peel strength and can cause a non-aqueous secondary battery to display excellent cycle characteristics.

In this disclosure, "volume average particle diameter" refers to a particle diameter (D50) at which, in a particle diameter distribution (volume basis) measured by laser diffraction, cumulative volume calculated from a small diameter end of the distribution reaches 50%.

In the presently disclosed binder composition for a non-aqueous secondary battery electrode, the second particulate polymer preferably further includes an aromatic vinyl monomer unit in a proportion of at least 10 mass % and not more than 70 mass %. As a result of the second particulate polymer including an aromatic vinyl monomer unit in a proportion of at least 10 mass % and not more than 70 mass %, the peel strength of an electrode produced using the binder composition can be further improved, and cycle characteristics of a non-aqueous secondary battery can be further improved.

Moreover, in the presently disclosed binder composition for a non-aqueous secondary battery electrode, the first particulate polymer is preferably natural rubber. As a result of natural rubber being used as the first particulate polymer, the peel strength of an electrode produced using the binder composition can be further improved, and cycle characteristics of a non-aqueous secondary battery can be further improved.

In a case in which the first particulate polymer is natural rubber, it is preferable that the presently disclosed binder composition for a non-aqueous secondary battery electrode further comprises a protein, wherein the protein has a content of at least $4.0 \times 10^{-4}$ parts by mass and not more than $5.0 \times 10^{-3}$ parts by mass per 100 parts by mass of the first particulate polymer. Through inclusion of a protein in a specific amount, a non-aqueous secondary battery can be caused to display even better cycle characteristics.

In this disclosure, "protein content" can be measured by the Kjeldahl method. Note that in a situation in which the measurement target composition contains a nitrogen-containing component other than a protein (for example, in a case in which a particulate polymer that includes a nitrogen-containing monomer unit is contained in the measurement target composition), the "protein content" can be determined by the Kjeldahl method by carrying out measurement after removing the aforementioned component or by separately measuring nitrogen content originating from this component and then subtracting this nitrogen content.

In the presently disclosed binder composition for a non-aqueous secondary battery electrode, the first particulate polymer preferably has a content of at least 20 mass % and not more than 90 mass % relative to total content of the first particulate polymer and the second particulate polymer. As a result of the content of the first particulate polymer being within the range set forth above, reduction in stability of a slurry composition containing the binder composition can be inhibited while enabling sufficient improvement of electrode peel strength.

Moreover, this disclosure aims to advantageously solve the problems set forth above by disclosing a slurry composition for a non-aqueous secondary battery electrode comprising: an electrode active material; and any of the foregoing binder compositions for a non-aqueous secondary battery electrode. Through inclusion of the binder composition containing the first particulate polymer and the second particulate polymer as set forth above, it is possible to form an electrode that has excellent peel strength and can cause a non-aqueous secondary battery to display excellent cycle characteristics.

In the presently disclosed slurry composition for a non-aqueous secondary battery electrode, the electrode active material preferably has a tap density of 1.1 g/cm³ or less. As a result of the electrode active material having a tap density of 1.1 g/cm³ or less, it is possible to form an electrode in which swelling associated with charging and discharging of a non-aqueous secondary battery does not readily occur. It should be noted that an electrode formed using an electrode active material that has a low tap density normally tends to suffer from a decrease in peel strength. However, by using a binder composition containing the first particulate polymer and the second particulate polymer, the peel strength of the electrode can be sufficiently improved.

In this disclosure, the "tap density" can be measured by a method described in the EXAMPLES section of the present specification.

Furthermore, this disclosure aims to advantageously solve the problems set forth above by disclosing an electrode for a non-aqueous secondary battery comprising an electrode mixed material layer formed using any of the foregoing slurry compositions for a non-aqueous secondary battery electrode. By forming an electrode mixed material layer using the slurry composition for a non-aqueous secondary battery electrode set forth above, an electrode for a non-aqueous secondary battery is obtained that has excellent peel strength and can cause a non-aqueous secondary battery to display excellent cycle characteristics.

Also, this disclosure aims to advantageously solve the problems set forth above by disclosing a non-aqueous secondary battery comprising: a positive electrode; a negative electrode; an electrolysis solution; and a separator, wherein at least one of the positive electrode and the negative electrode is the foregoing electrode for a non-aqueous secondary battery. By using the foregoing electrode for a non-aqueous secondary battery in this manner, battery characteristics such as cycle characteristics can be sufficiently improved.

Advantageous Effect

According to this disclosure, it is possible to provide a binder composition for a non-aqueous secondary battery electrode and a slurry composition for a non-aqueous secondary battery electrode that are capable of forming an electrode for a non-aqueous secondary battery that has excellent peel strength and can cause a non-aqueous secondary battery to display excellent cycle characteristics.

Moreover, according to this disclosure, it is possible to provide an electrode for a non-aqueous secondary battery that has excellent peel strength and can cause a non-aqueous secondary battery to display excellent cycle characteristics.

Furthermore, according to this disclosure, it is possible to provide a non-aqueous secondary battery having excellent battery characteristics such as cycle characteristics.

DETAILED DESCRIPTION

The following provides a detailed description of embodiments of the present disclosure.

The presently disclosed binder composition for a non-aqueous secondary battery electrode can be used in production of a slurry composition for a non-aqueous secondary battery electrode. Moreover, a slurry composition for a non-aqueous secondary battery electrode produced using the presently disclosed binder composition for a non-aqueous secondary battery electrode can be used in formation of an electrode of a non-aqueous secondary battery, such as a lithium ion secondary battery. Furthermore, the presently disclosed non-aqueous secondary battery includes an electrode for a non-aqueous secondary battery formed using the presently disclosed slurry composition for a non-aqueous secondary battery electrode.

Note that the presently disclosed binder composition for a non-aqueous secondary battery electrode and slurry composition for a non-aqueous secondary battery electrode are particularly suitable for use in formation of a negative electrode of a non-aqueous secondary battery.

(Binder Composition for Non-Aqueous Secondary Battery Electrode)

The presently disclosed binder composition for a non-aqueous secondary battery electrode contains a first particulate polymer and a second particulate polymer that have different make-ups to one another, and may optionally further contain other components that can be included in secondary battery electrodes. Moreover, the presently disclosed binder composition for a non-aqueous secondary battery electrode normally further contains a dispersion medium such as water. In the presently disclosed binder composition for a non-aqueous secondary battery electrode, the first particulate polymer includes an aliphatic conjugated diene monomer unit in a proportion of more than 90 mass % and the second particulate polymer includes an aliphatic conjugated diene monomer unit in a proportion of at least 20 mass % and not more than 60 mass %. Moreover, in the presently disclosed binder composition for a non-aqueous secondary battery electrode, the first particulate polymer has a volume average particle diameter of at least 0.6 µm and not more than 2.5 µm, and the second particulate polymer has a volume average particle diameter of at least 0.01 µm and not more than 0.5 µm.

When the presently disclosed binder composition for a non-aqueous secondary battery electrode is used in formation of an electrode mixed material layer of an electrode, the presently disclosed binder composition enables good binding amongst an electrode active material and between the electrode active material and a current collector as a result of containing both the first particulate polymer having a specific make-up and volume average particle diameter and the second particulate polymer having a specific make-up and volume average particle diameter. Accordingly, an electrode having excellent peel strength can be obtained using the presently disclosed binder composition for a non-aqueous secondary battery electrode. Moreover, by using an electrode formed using the binder composition containing the above-described first particulate polymer and second particulate polymer, it is possible to cause a non-aqueous secondary battery to display excellent battery characteristics, and particularly cycle characteristics.

As explained in detail below, natural rubber can be used as the first particulate polymer, and in a case in which natural rubber is used as the first particulate polymer, it is preferable that the presently disclosed binder composition for a non-aqueous secondary battery electrode further contains a specific amount of a protein. When a specific amount of a protein is included in a case in which the first particulate polymer is natural rubber, the stability of a slurry composition produced using the binder composition can be increased to enable favorable formation of an electrode mixed material layer, and the occurrence of side reactions in a secondary battery due to the protein (for example, protein decomposition) can be sufficiently inhibited.

<First Particulate Polymer>

In an electrode produced by forming an electrode mixed material layer on a current collector using a slurry composition for a non-aqueous secondary battery electrode produced using the binder composition, the first particulate polymer holds components contained in the electrode mixed material layer to prevent these components detaching from the electrode mixed material layer (i.e., the first particulate polymer functions as a binder).

[Make-Up of First Particulate Polymer]

The first particulate polymer is required to include an aliphatic conjugated diene monomer unit as a repeating unit and may optionally further include monomer units other than the aliphatic conjugated diene monomer unit (hereinafter, also referred to as "other monomer units").

[[Aliphatic Conjugated Diene Monomer Unit]]

Examples of aliphatic conjugated diene monomers that can be used to form the aliphatic conjugated diene monomer unit include, but are not specifically limited to, 1,3-butadiene, 2-methyl-1,3-butadiene (isoprene), and 2,3-dimethyl-1,3-butadiene. Of these aliphatic conjugated diene monomers, 1,3-butadiene and isoprene are preferable, and isoprene is more preferable. One aliphatic conjugated diene monomer may be used individually, or two or more aliphatic conjugated diene monomers may be used in combination in a freely selected ratio.

The proportion constituted by the aliphatic conjugated diene monomer unit in the first particulate polymer when the amount of all repeating units in the first particulate polymer is taken to be 100 mass % is required to be more than 90 mass % and not more than 100 mass %, and is preferably 92 mass % or more, and more preferably 95 mass % or more. As a result of the percentage content of the aliphatic conjugated diene monomer unit being more than 90 mass %, the peel strength of an electrode produced using the binder composition can be sufficiently improved.

An aliphatic conjugated diene monomer can normally form at least cis-1,4-bonded, trans-1,4-bonded, and vinyl-bonded monomer units through a polymerization reaction. In one specific example, 1,3-butadiene can normally form cis-1,4-bonded, trans-1,4-bonded, and 1,2-bonded (vinyl-bonded) monomer units through a polymerization reaction. In another example, isoprene can normally form cis-1,4-bonded and trans-1,4-bonded monomers units, and also 1,2-bonded and 3,4-bonded (vinyl-bonded) monomer units through a polymerization reaction. In the aliphatic conjugated diene monomer unit of the first particulate polymer, the proportion of cis-1,4-bonding is preferably 90 mol % to 100 mol %, more preferably 95 mol % or more, and even more preferably 99 mol % or more. When the proportion of cis-1,4-bonded monomer units among all aliphatic conjugated diene monomer units (100 mol %) in the first particulate polymer is at least the lower limit of any of the ranges set forth above, the peel strength of an electrode produced using the binder composition can be further improved, and cycle characteristics of a secondary battery including the electrode can be further improved. Note that the proportion of cis-1,4-bonded monomer units among aliphatic conjugated diene monomer units can be determined in accordance with the IR method of JIS K6239.

[[Other Monomer Units]]

Examples of monomer units other than the above-described aliphatic conjugated diene monomer unit that may be included in the first particulate polymer include, but are not specifically limited to, repeating units derived from known monomers that are copolymerizable with aliphatic conjugated diene monomers such as described above. Specific examples of other monomer units include, but are not specifically limited to, an aromatic vinyl monomer unit, a (meth)acrylic acid ester monomer unit, and a hydrophilic group-containing monomer unit.

One of such monomers may be used individually, or two or more of such monomers may be used in combination. Note that in this disclosure, "(meth)acryl" is used to indicate "acryl" and/or "methacryl".

Examples of aromatic vinyl monomers that can be used to form the aromatic vinyl monomer unit include styrene, styrenesulfonic acid and salts thereof, α-methylstyrene, butoxystyrene, and vinylnaphthalene.

Examples of (meth)acrylic acid ester monomers that can be used to form the (meth)acrylic acid ester monomer unit include alkyl esters of acrylic acid such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl esters of methacrylic acid such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

Examples of hydrophilic group-containing monomers that can be used to form the hydrophilic group-containing monomer unit include polymerizable monomers having a hydrophilic group. Specific examples of hydrophilic group-containing monomers include carboxylic acid group-containing monomers, sulfonate group-containing monomers, phosphate group-containing monomers, and hydroxy group-containing monomers.

Examples of carboxylic acid group-containing monomers include monocarboxylic acids and derivatives thereof; and dicarboxylic acids, acid anhydrides thereof, and derivatives of dicarboxylic acids and acid anhydrides thereof.

Examples of monocarboxylic acids include acrylic acid, methacrylic acid, and crotonic acid.

Examples of monocarboxylic acid derivatives include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of dicarboxylic acid derivatives include methylmaleic acid, dimethylmaleic acid, phenylmaleic acid, chloromaleic acid, dichloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methyl maleic anhydride, and dimethyl maleic anhydride.

Furthermore, an acid anhydride that produces a carboxyl group upon hydrolysis can also be used as a carboxylic acid group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfonate group-containing monomers include vinyl sulfonic acid, methyl vinyl sulfonic acid, (meth)allyl sulfonic acid, (meth)acrylic acid-2-ethyl sulfonate, 2-acrylamido-2-methylpropane sulfonic acid, and 3-allyloxy-2-hydroxypropane sulfonic acid.

In this disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In this disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1-COO-(C_qH_{2q}O)_p-H$ (where p represents an integer of 2 to 9, q represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

The percentage content of other monomer units in the first particulate polymer is preferably from 0 mass % to less than 10 mass %, more preferably 8 mass % or less, and even more preferably 5 mass % or less. When the percentage content of other monomer units is less than 10 mass %, reduction in stability of a slurry composition containing the binder composition can be inhibited.

The first particulate polymer having the make-up set forth above may be a polymer that is produced through artificial polymerization of a monomer composition containing the above-described monomers or may be natural rubber. Of these polymers, natural rubber is preferable as the first particulate polymer from a viewpoint of further improving electrode peel strength and secondary battery cycle characteristics. In other words, the binder composition is preferably produced using a natural rubber latex having natural rubber particles dispersed in a dispersion medium such as water.

In a case in which the first particulate polymer is produced through artificial polymerization of a monomer composition, the proportion constituted by each monomer in the monomer composition is normally the same as the proportion constituted by each monomer unit in the target polymer. No specific limitations are placed on the mode of polymerization of the first particulate polymer. For example, any of solution polymerization, suspension polymerization, bulk polymerization, and emulsion polymerization may be used. Moreover, the polymerization reaction may be addition polymerization such as ionic polymerization, radical polymerization, or living radical polymerization. An emulsifier, dispersant, polymerization initiator, polymerization aid, or the like used in polymerization may be the same as typically used, and the amount thereof may also be the same as typically used.

[Volume Average Particle Diameter]

The volume average particle diameter of the first particulate polymer is required to be at least 0.6 μm and not more than 2.5 μm. Moreover, the volume average particle diameter of the first particulate polymer is preferably 0.7 μm or more, and more preferably 0.8 μm or more, and is preferably 2.0 μm or less, more preferably 1.5 μm or less, and even more preferably 1.0 μm or less. When the volume average particle diameter of the first particulate polymer is within any of the ranges set forth above, the peel strength of an electrode produced using the binder composition can be sufficiently improved. Moreover, when the volume average particle diameter of the first particulate polymer is not more than any of the upper limits set forth above, a secondary battery can be caused to display excellent cycle characteristics.

In a case in which natural rubber is used as the first particulate polymer, the volume average particle diameter of the first particulate polymer can be adjusted by sedimentation, classification, or the like. On the other hand, in a case in which the first particulate polymer is produced through artificial polymerization of a monomer composition, the volume average particle diameter of the first particulate polymer can be adjusted by altering polymerization conditions such as the amount of emulsifier that is used.

<Second Particulate Polymer>

In an electrode produced by forming an electrode mixed material layer on a current collector using a slurry composition for a non-aqueous secondary battery electrode produced using the binder composition, the second particulate polymer holds components contained in the electrode mixed material layer to prevent these components detaching from the electrode mixed material layer (i.e., the second particulate polymer functions as a binder in conjunction with the previously described first particulate polymer).

[Make-Up of Second Particulate Polymer]

The second particulate polymer is required to include an aliphatic conjugated diene monomer unit as a repeating unit, and may optionally further include an aromatic vinyl monomer unit and/or monomer units other than an aliphatic conjugated diene monomer unit and an aromatic vinyl monomer unit (hereinafter, also referred to as "optional monomer units"). It is preferable that the second particulate polymer includes an aliphatic conjugated diene monomer unit and an aromatic vinyl monomer unit.

[[Aliphatic Conjugated Diene Monomer Unit]]

Examples of aliphatic conjugated diene monomers that can be used to form the aliphatic conjugated diene monomer unit of the second particulate polymer include the same aliphatic conjugated diene monomers as can be used to form the aliphatic conjugated diene monomer unit of the previously described first particulate polymer. Of these monomers, 1,3-butadiene and isoprene are preferable, and 1,3-butadiene is more preferable as the aliphatic conjugated diene monomer forming the aliphatic conjugated diene monomer unit of the second particulate polymer. One aliphatic conjugated diene monomer may be used individually, or two or more aliphatic conjugated diene monomers may be used in combination in a freely selected ratio.

The proportion constituted by the aliphatic conjugated diene monomer unit in the second particulate polymer when the amount of all repeating units in the second particulate polymer is taken to be 100 mass % is required to be at least 20 mass % and not more than 60 mass %, is preferably 25 mass % or more, and more preferably 30 mass % or more, and is preferably 55 mass % or less, more preferably 50 mass % or less, and even more preferably 40 mass % or less. When the percentage content of the aliphatic conjugated diene monomer unit is within any of the ranges set forth above, the peel strength of an electrode produced using the binder composition can be sufficiently improved, and a secondary battery including the electrode can be caused to display excellent cycle characteristics. In particular, when the percentage content of the aliphatic conjugated diene monomer unit is 25 mass % or more, the peel strength of an electrode produced using the binder composition can be further improved. Moreover, when the percentage content of the aliphatic conjugated diene monomer unit is 55 mass % or less, the cycle characteristics of a secondary battery including an electrode produced using the binder composition can be further improved.

[[Aromatic Vinyl Monomer Unit]]

Examples of aromatic vinyl monomers that can be used to form the aromatic vinyl monomer unit of the second particulate polymer include the same aromatic vinyl monomers as can be used to form other monomer units of the previously described first particulate polymer. Of these monomers, styrene and salts of styrene sulfonic acid are preferable, and styrene is more preferable as the aromatic vinyl monomer forming the aromatic vinyl monomer unit of the second particulate polymer. One aromatic vinyl monomer may be used individually, or two or more aromatic vinyl monomers may be used in combination in a freely selected ratio.

The proportion constituted by the aromatic vinyl monomer unit in the second particulate polymer is preferably 10 mass % or more, more preferably 15 mass % or more, even more preferably 20 mass % or more, further preferably 30 mass % or more, and particularly preferably 50 mass % or more, and is preferably 70 mass % or less, more preferably 68 mass % or less, and even more preferably 65 mass % or less. When the percentage content of the aromatic vinyl monomer unit is at least any of the lower limits set forth above, the cycle characteristics of a secondary battery including an electrode produced using the binder composition can be further improved. Moreover, when the percentage content of the aromatic vinyl monomer unit is not more than any of the upper limits set forth above, the peel strength of an electrode produced using the binder composition can be further improved.

[[Optional Monomer Units]]

Examples of optional monomer units other than the above-described aliphatic conjugated diene monomer unit and aromatic vinyl monomer unit that may be included in the second particulate polymer include, but are not specifically limited to, repeating units derived from known monomers that are copolymerizable with aliphatic conjugated diene monomers and aromatic vinyl monomers such as described above. Specific examples of such optional monomer units include, but are not specifically limited to, a (meth)acrylic acid ester monomer unit and a hydrophilic group-containing monomer unit. Of these optional monomer units, a hydrophilic group-containing monomer unit is preferable.

One of such monomers may be used individually, or two or more of such monomers may be used in combination.

Examples of (meth)acrylic acid ester monomers and hydrophilic group-containing monomers that can be used to form a (meth)acrylic acid ester monomer unit and a hydrophilic group-containing monomer unit of the second particulate polymer include the same (meth)acrylic acid ester monomers and hydrophilic group-containing monomers as can be used to form other monomer units in the previously described first particulate polymer. Of these monomers, methyl methacrylate and 2-ethylhexyl acrylate are preferable as (meth)acrylic acid ester monomers for forming a (meth)acrylic acid ester monomer unit of the second particulate polymer. Moreover, carboxylic acid group-containing monomers and hydroxy group-containing monomers are preferable, and itaconic acid and 2-hydroxyethyl acrylate (acrylic acid-2-hydroxyethyl) are more preferable as hydrophilic group-containing monomers for forming a hydrophilic group-containing monomer unit.

The percentage content of optional monomer units in the second particulate polymer is preferably from 0 mass % to 10 mass %, more preferably 7 mass % or less, and even more preferably 5 mass % or less. When the percentage content of optional monomer units is 10 mass % or less, reduction in stability of a slurry composition containing the binder composition can be inhibited.

The second particulate polymer having the make-up set forth above can be produced through polymerization of a monomer composition containing the above-described monomers but is not specifically limited to being produced in this manner. The proportion constituted by each monomer in the monomer composition is normally the same as the proportion constituted by each monomer unit in the target polymer. No specific limitations are placed on the mode of polymerization of the second particulate polymer. For example, any of solution polymerization, suspension polymerization, bulk polymerization, and emulsion polymerization may be used. Moreover, the polymerization reaction may be addition polymerization such as ionic polymerization, radical polymerization, or living radical polymerization. An emulsifier, dispersant, polymerization initiator, polymerization aid, or the like used in polymerization may be the same as typically used, and the amount thereof may also be the same as typically used.

[Volume Average Particle Diameter]

The volume average particle diameter of the second particulate polymer is required to be at least 0.01 μm and not more than 0.5 μm. Moreover, the volume average particle diameter of the second particulate polymer is preferably 0.05 μm or more, and more preferably 0.1 μm or more, and is preferably 0.4 μm or less, more preferably 0.3 μm or less, and even more preferably 0.2 μm or less. When the volume average particle diameter of the second particulate polymer is at least any of the lower limits set forth above, reduction in stability of a slurry composition containing the binder composition can be inhibited. Moreover, when the volume average particle diameter of the second particulate polymer is not more than any of the upper limits set forth above, the peel strength of an electrode produced using the binder composition can be sufficiently improved, and the cycle characteristics of a secondary battery including the electrode can be sufficiently improved.

The volume average particle diameter of the second particulate polymer can be adjusted by altering polymerization conditions such as the amount of emulsifier that is used.

<Percentage Content of Particulate Polymers>

The content of the first particulate polymer in the presently disclosed binder composition for a non-aqueous secondary battery electrode relative to the total content of the first particulate polymer and the second particulate polymer is preferably 20 mass % or more, more preferably 30 mass % or more, even more preferably 50 mass % or more, further preferably 55 mass % or more, even further preferably 60 mass % or more, and particularly preferably 65 mass % or more, and is preferably 90 mass % or less, more preferably 85 mass % or less, even more preferably 80 mass % or less, and particularly preferably 75 mass % or less. When the percentage content of the first particulate polymer relative to the total content of the first particulate polymer and the second particulate polymer is at least any of the lower limits set forth above, the peel strength of an electrode produced using the binder composition can be further improved. Moreover, when the percentage content of the first particulate polymer is not more than any of the upper limits set forth above, reduction in stability of a slurry composition containing the binder composition can be inhibited.

Note that the presently disclosed binder composition for a non-aqueous secondary battery electrode may further contain any polymer other than the above-described first and second particulate polymers as a binder.

<Dispersion Medium>

The dispersion medium contained in the presently disclosed binder composition for a non-aqueous secondary battery electrode may be water, for example, but is not specifically limited thereto. Alternatively, the dispersion medium may be an aqueous solution of any compound or a mixed solution of water and a small amount of an organic solvent.

<Protein>

No specific limitations are placed on the protein that may be contained in the binder composition in a situation in which the previously described first particulate polymer is natural rubber. For example, the protein may be a protein that is unavoidably mixed in during production of the binder composition, such as a protein originating from natural rubber particles used in production of the binder composition. Alternatively, the protein that is contained in the binder composition may be a protein that is intentionally added to the binder composition, such as a synthetic protein or a protein extracted from a natural product.

[Protein Content]

The content of the protein in the binder composition per 100 parts by mass of the first particulate polymer (natural rubber) is preferably $4.0\times10^{-4}$ parts by mass or more, more preferably $4.5\times10^{-4}$ parts by mass or more, even more preferably $5.0\times10^{-4}$ parts by mass or more, further preferably $7.0\times10^{-4}$ parts by mass or more, and particularly preferably $1.5\times10^{-3}$ parts by mass or more, and is preferably $5.0\times10^{-3}$ parts by mass or less, more preferably $4.5\times10^{-3}$ parts by mass or less, and even more preferably $4.0\times10^{-3}$ parts by mass or less. A protein content of $4.0\times10^{-4}$ parts by mass or more can increase the stability of a slurry composition produced using the binder composition and thereby enable favorable formation of an electrode mixed material layer using the slurry composition. Accordingly, electrode peel strength and secondary battery cycle characteristics can be sufficiently improved. Moreover, a protein content of $5.0\times10^{-3}$ parts by mass or less can suppress an increase in the amount of protein contained in an electrode mixed material layer formed using a slurry composition that contains the binder composition, and can, therefore, sufficiently inhibit the occurrence of side reactions in a secondary battery caused by the protein (for example, protein decomposition). Accordingly, deterioration of secondary battery cycle characteristics can be inhibited.

The method by which the protein content is adjusted is not specifically limited, and this adjustment may be performed, for example, through purification of natural rubber particles used in production of the binder composition, or through addition of a protein to the binder composition.

<Other Components>

The presently disclosed binder composition for a non-aqueous secondary battery electrode may, besides the components described above, contain other components such as a reinforcing material, a leveling agent, a viscosity modifier, and an additive for electrolysis solution. These other components are not specifically limited so long as they do not affect the battery reactions and may be selected from commonly known components such as those described in WO 2012/115096 A1. One of such components may be used individually, or two or more of such components may be used in combination in a freely selected ratio.

<Production Method of Binder Composition>

The presently disclosed binder composition for a non-aqueous secondary battery electrode can be produced, for example, by mixing a dispersion liquid containing the first particulate polymer, a dispersion liquid containing the second particulate polymer, and other optional components, but is not specifically limited to being produced in this manner. Note that in a situation in which a dispersion liquid of a particulate polymer is used in production of the binder composition, liquid content of this dispersion liquid may be used as the dispersion medium of the binder composition. Moreover, in a case in which a binder composition for a non-aqueous secondary battery electrode that contains a protein is to be produced, an operation of adjusting the protein content (protein addition or protein removal by purification) may optionally be performed.

(Slurry Composition for Non-Aqueous Secondary Battery Electrode)

The presently disclosed slurry composition for a non-aqueous secondary battery electrode contains an electrode active material and the binder composition set forth above, and may optionally further contain a protein and/or other components. In other words, the presently disclosed slurry composition for a non-aqueous secondary battery electrode normally contains an electrode active material, the above-described first and second particulate polymers, and a dispersion medium, and optionally further contains a protein and/or other components. When the presently disclosed slurry composition for a non-aqueous secondary battery electrode is used to form an electrode mixed material layer of an electrode, good binding amongst the electrode active material and between the electrode active material and a current collector can be achieved as a result of the binder composition set forth above being contained therein. Accordingly, an electrode having excellent peel strength can be obtained using the presently disclosed slurry composition for a non-aqueous secondary battery electrode. Moreover, through use of an electrode formed using the slurry composition containing the binder composition set forth above, a non-aqueous secondary battery can be caused to display excellent battery characteristics, and particularly cycle characteristics.

Although the following describes, as one example, a case in which the slurry composition for a non-aqueous secondary battery electrode is a slurry composition for a lithium ion secondary battery negative electrode, the presently disclosed slurry composition for a non-aqueous secondary battery is not limited to the following example.

<Electrode Active Material>

The electrode active material is a material that accepts and donates electrons in an electrode of a secondary battery. The negative electrode active material of a lithium ion secondary battery is normally a material that can occlude and release lithium.

Specific examples of negative electrode active materials for lithium ion secondary batteries include carbon-based negative electrode active materials, metal-based negative electrode active materials, and negative electrode active materials formed by combining these materials.

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

Examples of carbonaceous materials include graphitizing carbon and non-graphitizing carbon, typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of graphitic materials include natural graphite and artificial graphite.

Examples of the artificial graphite include an artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material that contains metal, the structure of which usually contains an element that allows insertion of lithium, and that exhibits a theoretical electric capacity per unit mass of 500 mAh/g or more when lithium is inserted. Examples of the metal-based negative electrode active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

[Properties of Electrode Active Material]

The tap density of the electrode active material is preferably 1.1 g/cm$^3$ or less, more preferably 1.05 g/cm$^3$ or less, and even more preferably 1.03 g/cm$^3$ or less. The electrode active material expands and contracts in accompaniment to charging and discharging, but when the tap density of the electrode active material is not more than any of the upper limits set forth above, it is possible to form an electrode that tends not to swell in association with charging and discharging. The tap density of the electrode active material is normally 0.7 g/cm$^3$ or more, preferably 0.75 g/cm$^3$ or more, and more preferably 0.8 g/cm$^3$ or more.

An electrode active material having a low tap density normally has fine protrusions and recesses. Consequently, in a situation in which only a particulate polymer having a small particle diameter is used as a binder, it may not be possible to achieve good binding of the electrode active material because the particulate polymer may enter the recesses of the low-tap density electrode active material. On the other hand, in a situation in which only a particulate polymer having a large particle diameter is used as a binder, it may not be possible to achieve good binding of the electrode active material because contact area of the electrode active material and the particulate polymer is reduced. However, as a result of the presently disclosed slurry composition for a non-aqueous secondary battery electrode containing the above-described first and second particulate polymers having specific make-ups and volume average particle diameters, an electrode having excellent peel strength can be formed even in a case in which an electrode active material having a low tap density is used.

<Binder Composition>

The binder composition that is used may be the binder composition for a non-aqueous secondary battery electrode containing the first and second particulate polymers set forth above.

Although no specific limitations are placed on the amount of the binder composition, the amount may be set such that the total amount of the first particulate polymer and the second particulate polymer in terms of solid content per 100 parts by mass of the electrode active material, for example, is at least 0.5 parts by mass and not more than 4.0 parts by mass.

<Protein>

In a case in which the above-described binder composition is a binder composition in which the first particulate polymer is natural rubber and that contains a protein, the slurry composition containing this binder composition also contains a first particulate polymer composed of natural rubber and a protein.

When the slurry composition contains a first particulate polymer composed of natural rubber and a protein, the protein content in the slurry composition per 100 parts by mass of solid content in the slurry composition is preferably 6.0×10$^{-6}$ parts by mass or more, more preferably 1.1×10$^{-5}$ parts by mass or more, and even more preferably 4.0×10$^{-5}$ parts by mass or more, and is preferably 1.0×10$^{-4}$ parts by mass or less, and more preferably 5.0×10$^{-5}$ parts by mass or less. A protein content that is at least any of the lower limits set forth above can increase the stability of the slurry composition and thereby enable favorable formation of an electrode mixed material layer using the slurry composition. Accordingly, electrode peel strength and secondary battery cycle characteristics can be sufficiently improved. Moreover, a protein content that is not more than any of the upper limits set forth above can suppress an increase in the amount of protein contained in an electrode mixed material layer formed using the slurry composition and can sufficiently inhibited the occurrence of side reactions in a secondary battery caused by the protein (for example, protein decomposition). Accordingly, deterioration of secondary battery cycle characteristics can be inhibited.

<Other Components>

Examples of other components that may be contained in the slurry composition include, but are not specifically limited to, the same other components as may be contained in the presently disclosed binder composition. The slurry composition may further contain a conductive material such as carbon black. One of such other components may be used individually, or two or more of such other components may be used in combination in a freely selected ratio.

<Production of Slurry Composition>

The slurry composition set forth above may be produced by dispersing or dissolving the above-described components in a dispersion medium such as water. Specifically, the slurry composition may be produced by mixing the components and the dispersion medium using a mixer such as a ball mill, a sand mill, a bead mill, a pigment disperser, a grinding machine, an ultrasonic disperser, a homogenizer, a planetary mixer, or a FILMIX. Mixing of the components and the dispersion medium may normally be performed for a period of from 10 minutes to several hours in a temperature range of from room temperature to 80° C. The dispersion medium that is used in production of the slurry composition may be the same type of dispersion medium as in the binder composition. Moreover, the dispersion medium used in production of the slurry composition may include the dispersion medium that was contained in the binder composition.

(Electrode for Non-Aqueous Secondary Battery)

The presently disclosed electrode for a non-aqueous secondary battery includes an electrode mixed material layer formed using the slurry composition for a non-aqueous secondary battery electrode set forth above, and normally includes a current collector having the electrode mixed material layer formed thereon. The electrode mixed material layer contains at least the electrode active material and polymer derived from the first and second particulate polymers. It should be noted that components contained in the electrode mixed material layer are components that were contained in the slurry composition for a non-aqueous secondary battery electrode. Furthermore, the preferred ratio of these components in the electrode mixed material layer is the same as the preferred ratio of these components in the slurry composition. Although the first particulate polymer and the second particulate polymer are each in a particulate form in the slurry composition, in the electrode mixed material layer formed using this slurry composition, the first particulate polymer and the second particulate polymer may each be in a particulate form or in any other form.

In the presently disclosed electrode for a non-aqueous secondary battery, good binding between the electrode mixed material layer and the current collector is achieved as a result of a slurry composition that contains the presently disclosed binder composition for a non-aqueous secondary battery electrode being used. Thus, the presently disclosed electrode for a non-aqueous secondary battery has excellent peel strength. Moreover, as a result of the presently disclosed electrode for a non-aqueous secondary battery being formed using a slurry composition that contains the presently disclosed binder composition for a non-aqueous secondary battery electrode, a secondary battery having excellent battery characteristics such as cycle characteristics can be obtained using the electrode.

<Production Method of Electrode>

The presently disclosed electrode for a non-aqueous secondary battery is produced, for example, through a step of applying the slurry composition set forth above onto the current collector (application step), and a step of drying the slurry composition that has been applied onto the current collector to form the electrode mixed material layer on the current collector (drying step).

[Application Step]

The slurry composition may be applied onto the current collector by a commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. One of such materials may be used individually, or two or more of such materials may be used in combination in a freely selected ratio.

[Drying Step]

The slurry composition on the current collector may be dried by a commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, an electrode mixed material layer can be formed on the current collector to thereby obtain an electrode for a secondary battery that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector. Furthermore, in a case in which the electrode mixed material layer contains a curable polymer, the polymer is preferably cured after the electrode mixed material layer has been formed.

(Non-Aqueous Secondary Battery)

The presently disclosed non-aqueous secondary battery includes a positive electrode, a negative electrode, an electrolysis solution, and a separator, wherein the presently disclosed electrode for a non-aqueous secondary battery is used as at least one of the positive electrode and the negative electrode. The presently disclosed non-aqueous secondary battery has excellent battery characteristics such as cycle characteristics as a result of including the presently disclosed electrode for a non-aqueous secondary battery.

It is preferable that the presently disclosed electrode for a non-aqueous secondary battery is used as the negative electrode in the presently disclosed non-aqueous secondary battery. Although the following describes, as one example, a case in which the secondary battery is a lithium ion secondary battery, the presently disclosed secondary battery is not limited to the following example.

<Electrodes>

As explained above, the presently disclosed electrode for a non-aqueous secondary battery is used as at least one of the positive electrode and the negative electrode. In other words, the positive electrode of the lithium ion secondary battery may be the presently disclosed electrode and the negative electrode of the lithium ion secondary battery may be a known negative electrode other than the presently disclosed electrode. Alternatively, the negative electrode of the lithium ion secondary battery may be the presently disclosed electrode and the positive electrode of the lithium ion secondary battery may be a known positive electrode other than the presently disclosed electrode. Further alternatively, the positive electrode and the negative electrode of the lithium ion secondary battery may both be the presently disclosed electrode.

Note that when a known electrode other than the presently disclosed electrode for a non-aqueous secondary battery is used, this electrode may be an electrode that is obtained by forming an electrode mixed material layer on a current collector by a known production method.

<Electrolysis Solution>

The electrolysis solution is normally an organic electrolysis solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent that is used in the electrolysis solution is not specifically limited so long as the supporting electrolyte dissolves therein. Suitable examples include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferred for their high dielectric constant and broad stable potential region.

The concentration of the electrolyte in the electrolysis solution may be adjusted as appropriate and is, for example, preferably 0.5 mass % to 15 mass %, more preferably 2 mass % to 13 mass %, and even more preferably 5 mass % to 10 mass %. Known additives such as vinylene carbonate, fluoroethylene carbonate, and ethyl methyl sulfone may be added to the electrolysis solution.

<Separator>

The separator may be a separator such as described in JP 2012-204303 A, for example, but is not specifically limited thereto. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

<Production Method of Secondary Battery>

The presently disclosed non-aqueous secondary battery may be produced, for example, by stacking the positive electrode and the negative electrode with the separator in-between, performing rolling, folding, or the like of the resultant laminate as necessary in accordance with the battery shape, placing the laminate in a battery container, injecting the electrolysis solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used in the examples and comparative examples to measure and evaluate the volume average particle diameter of a particulate polymer, the tap density of a negative electrode active material, the protein content of a binder composition and a slurry composition, the stability of a slurry composition, the peel strength of a negative electrode, and the cycle characteristics of a secondary battery.

<Volume Average Particle Diameter>

A laser diffraction particle diameter distribution analyzer (produced by Beckman Coulter, Inc.; product name: LS-230) was used to measure a particle diameter distribution (volume basis) with respect to a water dispersion of a particulate polymer that had been adjusted to a solid content concentration of 0.1 mass %. In the obtained particle diameter distribution, the particle diameter at which cumulative volume calculated from the small diameter end of the distribution reached 50% was determined as the volume average particle diameter (D50) of the particulate polymer.

<Tap Density>

The tap density of a negative electrode active material was measured using a Powder Tester® (Powder Tester is a registered trademark in Japan, other countries, or both) produced by Hosokawa Micron Corporation (product name: PT-D). Specifically, a powder of the negative electrode active material that had been loaded into a measurement vessel was first leveled off at the upper surface of the vessel. Next, a cap provided with the measurement device was attached to the measurement vessel and further negative electrode active material powder was added up to an upper edge of the attached cap. Tapping was then performed by repeatedly dropping the measurement vessel 180 times from a height of 1.8 cm. After this tapping, the cap was removed, and the negative electrode active material powder was once again leveled off at the upper surface of the vessel. The tapped and leveled sample was weighed, and the bulk density in this state was measured as the packed bulk density (i.e., the tap density (g/cm$^3$)).

<Protein Content>

The nitrogen content of a binder composition was determined by the Kjeldahl method, and this nitrogen content was taken to be the protein content. Specifically, the binder composition was dried for 3 days in an environment having a humidity of 50% and a temperature of 23° C. to 25° C. to form a film of 3±0.3 mm in thickness. The nitrogen content of the obtained film was measured by the Kjeldahl method, and the protein content was determined.

In the case of a slurry composition, the protein content thereof was calculated from the protein content of the binder composition and the amount of the binder composition.

<Stability of Slurry Composition>

In production of a slurry composition, the viscosity M0 (mPa·s) of a mixed liquid prior to addition of a binder composition and the viscosity M1 (mPa·s) of a mixed liquid after addition of the binder composition were measured. The viscosity was measured by a B-type viscometer (produced by Toki Sangyo Co., Ltd.; product name: TV-25) at a temperature of 25° C. and a rotor speed of 60 rpm using a No. 4 rotor.

The rate of viscosity change ΔM (=M1/M0 (factor)) was calculated and was evaluated by the following standard. A smaller value for the rate of viscosity change ΔM indicates less thickening upon addition of the binder composition and higher stability of the slurry composition.

A: Rate of viscosity change ΔM of less than a factor of 1.1
B: Rate of viscosity change ΔM of at least a factor of 1.1 and less than a factor of 1.5
C: Rate of viscosity change ΔM of at least a factor of 1.5 and less than a factor of 1.8
D: Rate of viscosity change ΔM of a factor of 1.8 or more <Peel Strength>

A produced negative electrode was cut out as a rectangle of 100 mm in length by 10 mm in width to obtain a specimen. The specimen was placed with the surface of the negative electrode mixed material layer underneath, and cellophane tape was affixed to the surface of the negative electrode mixed material layer. Tape prescribed by JIS Z1522 was used as the cellophane tape. Moreover, the cellophane tape was fixed to a test bed. Thereafter, one end of the current collector was pulled vertically upward at a pulling speed of 50 mm/minute to peel off the current collector, and the stress during this peeling was measured. This measurement was made three times and an average value of the stress was determined. The average value was taken to be the peel strength and was evaluated by the following standard. A larger peel strength indicates larger binding force of the negative electrode mixed material layer to the current collector, and thus indicates stronger adhesion.

A: Peel strength of 24 N/m or more
B: Peel strength of at least 19 N/m and less than 24 N/m
C: Peel strength of at least 14 N/m and less than 19 N/m
D: Peel strength of less than 14 N/m <Cycle Characteristics>

A produced lithium ion secondary battery having a capacity of 800 mAh was left for 24 hours at an ambient temperature of 25° C. Thereafter, the lithium ion secondary battery was subjected to a charge/discharge operation at an ambient temperature of 25° C. of charging to 4.35 V at a charge rate of 1C and discharging to 3.0 V at a discharge rate of 1C, and the initial capacity C0 was measured. The lithium ion secondary battery was also repeatedly subjected to the same charge/discharge operation at an ambient temperature of 45° C., and the capacity C1 after 300 cycles was measured. The capacity maintenance rate ΔC=(C1/C0)×100(%) was calculated and was evaluated by the following standard. A higher capacity maintenance rate indicates a smaller decrease of discharge capacity, and thus indicates better cycle characteristics.

A: Capacity maintenance rate ΔC of 80% or more
B: Capacity maintenance rate ΔC of at least 75% and less than 80%
C: Capacity maintenance rate ΔC of at least 70% and less than 75%
D: Capacity maintenance rate ΔC of less than 70%

Example 1

<Preparation of First Particulate Polymer>

A natural rubber latex (produced by Musashino Chemical Corporation; product name: LA Type; solid content concentration: 62%) containing natural rubber (NR) particles having a volume average particle diameter of 0.9 µm was prepared as a first particulate polymer.

<Production of Second Particulate Polymer>

A vessel A was charged with a mixture of 33 parts of 1,3-butadiene as an aliphatic conjugated diene monomer, 62 parts of styrene as an aromatic vinyl monomer, 4 parts of itaconic acid as a carboxylic acid group-containing monomer, 0.3 parts of tert-dodecyl mercaptan as a chain transfer agent, and 0.3 parts of sodium lauryl sulfate as an emulsifier. Polymerization was initiated by starting addition of the mixture from the vessel A to a pressure vessel B and simultaneously starting addition of 1 part of potassium persulfate to the pressure vessel B as a polymerization initiator. The reaction temperature was maintained at 75° C.

Once 4 hours had passed from the start of polymerization (after addition of 70% of the mixture to the pressure vessel B), 1 part of 2-hydroxyethyl acrylate (acrylic acid-2-hydroxyethyl) was added to the pressure vessel B as a hydroxy group-containing monomer over a period of 1 hour and 30 minutes.

Addition of the total amount of the above-described monomers was completed 5 hours and 30 minutes after the start of polymerization. Heating was subsequently performed to 85° C. and a reaction was carried out for 6 hours.

The reaction was terminated by cooling at the point at which the polymerization conversion rate reached 97% to yield a mixture containing a particulate polymer. The mixture containing the particulate polymer was adjusted to a pH of 8 through addition of 5% sodium hydroxide aqueous solution. Unreacted monomers were subsequently removed by distillation under heating and reduced pressure. Cooling was then performed to yield a water dispersion (solid content concentration: 40%) containing a second particulate polymer having a volume average particle diameter of 0.15 µm.

<Production of Binder Composition>

The natural rubber latex and the water dispersion were added into a vessel such that the solid content ratio of the first and second particulate polymers (first particulate polymer:second particulate polymer) was 70:30. Stirring was performed for 1 hour using a Three-One Motor to yield a binder composition for a non-aqueous secondary battery electrode.

The protein content of the resultant binder composition was measured. The results are shown in Table 1.

<Production of Slurry Composition>

A planetary mixer equipped with a disper blade was charged with 70 parts of artificial graphite (produced by Hitachi Chemical Co., Ltd.; product name: MAG-E) and 25.6 parts of natural graphite (produced by Nippon Carbon Co., Ltd.; product name: 604A) as negative electrode active materials, 1 part of carbon black (produced by Timcal Ltd.; product name: Super C65) as a conductive material, and 1.2 parts in terms of solid content of a 2% aqueous solution of carboxymethyl cellulose (produced by Nippon Paper Chemicals Co., Ltd.; product name: MAC-350HC) as a viscosity modifier to obtain a mixture. The resultant mixture was adjusted to a solid content concentration of 60% with deionized water and was subsequently mixed for 60 minutes at 25° C. Next, the mixture was adjusted to a solid content concentration of 52% with deionized water and was then further mixed for 15 minutes at 25° C. to yield a mixed liquid. Deionized water and 2.2 parts in terms of solid content of the binder composition for a non-aqueous secondary battery electrode were added to the resultant mixed liquid, and the final solid content concentration was adjusted to 48%. Further mixing was performed for 10 minutes and then a defoaming process was carried out under reduced pressure to yield a slurry composition for a non-aqueous secondary battery negative electrode having good fluidity.

The tap density of the used negative electrode active material (measured value for the artificial graphite and the natural graphite) was 0.85 g/cm$^3$.

The stability of the slurry composition was evaluated. Moreover, the protein content of the slurry composition was calculated. The results are shown in Table 1.

<Production of Negative Electrode>

The obtained slurry composition for a non-aqueous secondary battery negative electrode was applied onto copper foil (current collector) of 20 µm in thickness using a comma coater such as to have a thickness of approximately 150 µm after drying. The applied slurry composition was dried by conveying the copper foil inside a 60° C. oven for 2 minutes at a speed of 0.5 m/minute. Thereafter, heat treatment was performed for 2 minutes at 120° C. to obtain a pre-pressing negative electrode web. The pre-pressing negative electrode web was rolled by roll pressing to obtain a post-pressing negative electrode including a negative electrode mixed material layer of 80 µm in thickness.

The peel strength of this negative electrode was evaluated. The results are shown in Table 1.

<Production of Positive Electrode>

A slurry composition for a non-aqueous secondary battery positive electrode was obtained by combining 100 parts of LiCoO$_2$ having a volume average particle diameter of 12 µm as a positive electrode active material, 2 parts of acetylene black (produced by Denki Kagaku Kogyo Kabushiki Kaisha; product name: HS-100) as a conductive material, 2 parts in terms of solid content of polyvinylidene fluoride (produced by Kureha Corporation; product name: #7208) as a binder, and N-methylpyrrolidone as a solvent such as to have a total solid content concentration of 70%, and mixing these materials using a planetary mixer.

The obtained slurry composition for a non-aqueous secondary battery positive electrode was applied onto aluminum foil (current collector) of 20 µm in thickness using a comma coater such as to have a thickness of approximately 150 µm after drying. The applied slurry composition was dried by conveying the aluminum foil inside a 60° C. oven for 2 minutes at a speed of 0.5 m/minute. Thereafter, heat treatment was performed for 2 minutes at 120° C. to obtain a positive electrode web.

The resultant positive electrode web was rolled by a roll press to obtain a positive electrode including a positive electrode mixed material layer.

<Preparation of Separator>

A single-layer polypropylene separator (produced by Celgard, LLC.; product name: Celgard 2500) was cut out to 120 cm×5.5 cm in size.

<Production of Secondary Battery>

The post-pressing positive electrode that was obtained was cut out as a 49 cm×5 cm rectangle and was placed with the surface at the positive electrode mixed material layer side of the positive electrode on top. The separator that had been cut out to 120 cm×5.5 cm in size was placed on the positive electrode mixed material layer such that the positive electrode was positioned at the longitudinal direction left-hand side of the separator. The post-pressing negative electrode that was obtained was cut out as a 50 cm×5.2 cm rectangle and was placed on the separator such that the surface at the negative electrode mixed material layer side of the negative electrode faced the separator and such that the negative electrode was positioned at the longitudinal direction right-hand side of the separator. The resultant laminate was wound by a winding machine to obtain a roll. This roll was enclosed in an aluminum packing case used as a battery case. An electrolysis solution (solvent: ethylene carbonate/diethyl carbonate/vinylene carbonate=68.5/30/1.5 (volume ratio); electrolyte: $LiPF_6$ of 1 M in concentration) was injected into the aluminum packing case such that no air remained, and then an opening of the aluminum packing case was heat sealed at 150° C. to close the aluminum packing case, and thereby produce a wound lithium ion secondary battery having a capacity of 800 mAh.

The cycle characteristics of the lithium ion secondary battery were evaluated. The results are shown in Table 1.

Example 2

A binder composition, a slurry composition, a negative electrode, a positive electrode, a separator, and a secondary battery were produced in the same way as in Example 1 with the exception that a latex of a first particulate polymer (polyisoprene) produced as described below was used instead of the natural rubber latex used in Example 1 (produced by Musashino Chemical Corporation; product name: LA Type). Evaluations were conducted in the same manner as in Example 1. The results are shown in Table 1.
<Production of First Particulate Polymer>

Isoprene rubber (produced by Zeon Corporation; product name: Nipol IR2200) was dissolved in toluene to prepare an isoprene rubber solution of 25% in concentration.

Next, a mixture of sodium linear alkylbenzene sulfonate, sodium alkyl polyoxyethylene sulfonate, and sodium alkyl polyoxyethylene sulfosuccinate mixed in a ratio of 1:1:1 was dissolved in deionized water to produce an aqueous solution having a total solid content concentration of 2%.

A tank was charged with 500 g of the isoprene rubber solution and 500 g of the aqueous solution, and preliminary mixing of these materials was performed by stirring. Next, a metering pump was used to transfer the preliminary mixture from the tank to a Milder (produced by Pacific Machinery & Engineering Co., Ltd.; product name: MDN303V) at a rate of 100 g/minute, and the preliminary mixture was stirred at a rotation speed of 20,000 rpm to cause emulsification (phase-inversion emulsification).

Next, toluene in the resultant emulsion was removed by evaporation under reduced pressure in a rotary evaporator. The emulsion was subsequently left to separate for 1 day in a chromatographic column equipped with a stop-cock, and a lower layer portion was removed after separation to perform concentration.

Finally, an upper layer portion was filtered through a 100-mesh screen to obtain a latex containing polyisoprene (IR) particles as a first particulate polymer. The resultant polyisoprene latex had a solid content concentration of 60% and a volume average particle diameter of 1.2 μm.

Example 3

A binder composition, a slurry composition, a negative electrode, a positive electrode, a separator, and a secondary battery were produced in the same way as in Example 1 with the exception that a latex of a first particulate polymer produced as described below was used instead of the natural rubber latex used in Example 1 (produced by Musashino Chemical Corporation; product name: LA Type). Evaluations were conducted in the same manner as in Example 1. The results are shown in Table 1.
<Production of First Particulate Polymer>

Butadiene rubber (produced by Zeon Corporation; product name: Nipol BR1220) was dissolved in toluene to prepare a butadiene rubber solution of 25% in concentration.

Next, a mixture of sodium linear alkylbenzene sulfonate, sodium alkyl polyoxyethylene sulfonate, and sodium alkyl polyoxyethylene sulfosuccinate mixed in a ratio of 1:1:1 was dissolved in deionized water to produce an aqueous solution having a total solid content concentration of 2%.

A tank was charged with 500 g of the butadiene rubber solution and 500 g of the aqueous solution, and preliminary mixing of these materials was performed by stirring. Next, a metering pump was used to transfer the preliminary mixture from the tank to a Milder (produced by Pacific Machinery & Engineering Co., Ltd.; product name: MDN303V) at a rate of 100 g/minute, and the preliminary mixture was stirred at a rotation speed of 20,000 rpm to cause emulsification (phase-inversion emulsification).

Next, toluene in the resultant emulsion was removed by evaporation under reduced pressure in a rotary evaporator. The emulsion was subsequently left to separate for 1 day in a chromatographic column equipped with a stop-cock, and a lower layer portion was removed after separation to perform concentration.

Finally, an upper layer portion was filtered through a 100-mesh screen to obtain a latex containing polybutadiene (BR) particles as a first particulate polymer. The resultant polybutadiene latex had a solid content concentration of 60% and a volume average particle diameter of 1.1 μm.

Example 4

A binder composition, a slurry composition, a negative electrode, a positive electrode, a separator, and a secondary battery were produced in the same way as in Example 1 with the exception that a latex of a first particulate polymer produced as described below was used instead of the natural rubber latex used in Example 1 (produced by Musashino Chemical Corporation; product name: LA Type). Evaluations were conducted in the same manner as in Example 1. The results are shown in Table 1.
<Production of First Particulate Polymer>

A natural rubber latex (produced by Musashino Chemical Corporation; product name: LA Type) was diluted to a solid content concentration of 10% and was left for 30 days. Thereafter, a supernatant constituting 15% of the total amount was removed to obtain a latex containing natural rubber (NR) particles having a volume average particle diameter of 2.3 μm as a first particulate polymer.

Example 5

A binder composition, a slurry composition, a negative electrode, a positive electrode, a separator, and a secondary battery were produced in the same way as in Example 1 with the exception that in production of the second particulate polymer, the amount of 1,3-butadiene was changed to 24 parts and the amount of styrene was changed to 71 parts. Evaluations were conducted in the same manner as in Example 1. The results are shown in Table 1.

Example 6

A binder composition, a slurry composition, a negative electrode, a positive electrode, a separator, and a secondary battery were produced in the same way as in Example 1 with the exception that in production of the second particulate polymer, the amount of 1,3-butadiene was changed to 53 parts and the amount of styrene was changed to 42 parts. Evaluations were conducted in the same manner as in Example 1. The results are shown in Table 1.

Example 7

A binder composition, a slurry composition, a negative electrode, a positive electrode, a separator, and a secondary battery were produced in the same way as in Example 1 with the exception that in production of the second particulate polymer, the amount of tert-dodecyl mercaptan was changed to 0.4 parts and the amount of sodium lauryl sulfate was changed to 0.5 parts. Evaluations were conducted in the same manner as in Example 1. The results are shown in Table 1.

Example 8

A binder composition, a slurry composition, a negative electrode, a positive electrode, a separator, and a secondary battery were produced in the same way as in Example 1 with the exception that in production of the second particulate polymer, the amount of tert-dodecyl mercaptan was changed to 0.2 parts and the amount of sodium lauryl sulfate was changed to 0.1 parts. Evaluations were conducted in the same manner as in Example 1. The results are shown in Table 1.

Examples 9 and 10

A binder composition, a slurry composition, a negative electrode, a positive electrode, a separator, and a secondary battery were produced in the same way as in Example 1 with the exception that in production of the binder composition, the mixing ratio of the natural rubber latex and the water dispersion was changed to achieve a ratio of the first and second particulate polymers (first particulate polymer:second particulate polymer) of 55:45 (Example 9) or 90:10 (Example 10). Evaluations were conducted in the same manner as in Example 1. The results are shown in Table 1.

Example 11

A binder composition, a slurry composition, a negative electrode, a positive electrode, a separator, and a secondary battery were produced in the same way as in Example 1 with the exception that a latex of a first particulate polymer produced as described below was used instead of the natural rubber latex used in Example 1 (produced by Musashino Chemical Corporation; product name: LA Type). Evaluations were conducted in the same manner as in Example 1. The results are shown in Table 2.
<Production of First Particulate Polymer>
A natural rubber latex (produced by Musashino Chemical Corporation; product name: LA Type) was diluted to a solid content concentration of 10% and was left for 30 days. Thereafter, a supernatant constituting 15% of the total amount was removed to obtain a water dispersion containing natural rubber particles having a volume average particle diameter of 2.1 μm as a first particulate polymer.

In addition, a natural rubber latex (produced by Musashino Chemical Corporation; product name: LA Type) was subjected to centrifugal separation for 30 minutes at a rotation speed of 10,000 rpm using a centrifugal separator (produced by Kokusan Co., Ltd.; product name: H-2000B). Thereafter, a supernatant was collected, and protein contained in the natural rubber latex was extracted from this supernatant. The extracted protein was added to the water dispersion containing the natural rubber particles having a volume average particle diameter of 2.1 μm that was obtained as described above in order to adjust the protein content to $3.0 \times 10^{-3}$ parts per 100 parts of natural rubber particles.

Example 12

A binder composition, a slurry composition, a negative electrode, a positive electrode, a separator, and a secondary battery were produced in the same way as in Example 1 with the exception that a natural rubber latex (produced by Sumitomo Rubber Industries, Inc.; product name: SELATEX 1101; solid content concentration: 60%) containing natural rubber particles having a volume average particle diameter of 0.85 μm was used instead of the natural rubber latex used in Example 1 (produced by Musashino Chemical Corporation; product name: LA Type). Evaluations were conducted in the same manner as in Example 1. The results are shown in Table 2.

Example 13

A binder composition, a slurry composition, a negative electrode, a positive electrode, a separator, and a secondary battery were produced in the same way as in Example 1 with the exception that a latex of a first particulate polymer produced as described below was used instead of the natural rubber latex used in Example 1 (produced by Musashino Chemical Corporation; product name: LA Type). Evaluations were conducted in the same manner as in Example 1. The results are shown in Table 2.
<Production of First Particulate Polymer>
A natural rubber latex (produced by Musashino Chemical Corporation; product name: LA Type) was subjected to centrifugal separation for 30 minutes at a rotation speed of 10,000 rpm using a centrifugal separator (produced by Kokusan Co., Ltd.; product name: H-2000B). Thereafter, a supernatant was collected, and protein contained in the natural rubber latex was extracted from this supernatant. The extracted protein was added to a natural rubber latex (produced by Musashino Chemical Corporation; product name: LA Type) that had not been subjected to a protein extraction operation in order to adjust the protein content to $4.8 \times 10^{-3}$ parts per 100 parts of natural rubber particles.

Example 14

A binder composition, a slurry composition, a negative electrode, a positive electrode, a separator, and a secondary battery were produced in the same way as in Example 1 with the exception that in production of the second particulate polymer, the amount of 1,3-butadiene was changed to 60 parts and the amount of styrene was changed to 35 parts. Evaluations were conducted in the same manner as in Example 1. The results are shown in Table 2.

Comparative Example 1

A binder composition, a slurry composition, a negative electrode, a positive electrode, a separator, and a secondary battery were produced in the same way as in Example 1 with the exception that a latex of a first particulate polymer produced as described below was used instead of the natural rubber latex used in Example 1. Evaluations were conducted in the same manner as in Example 1. The results are shown in Table 1.

<Production of First Particulate Polymer>

A natural rubber latex (produced by Musashino Chemical Corporation; product name: LA Type) was diluted to a solid content concentration of 10% and was left for 30 days. Thereafter, a supernatant constituting 20% of the total amount was removed to obtain a latex containing natural rubber (NR) particles having a volume average particle diameter of 3.0 μm as a first particulate polymer.

Comparative Example 2

A binder composition, a slurry composition, a negative electrode, a positive electrode, a separator, and a secondary battery were produced in the same way as in Example 1 with the exception that in production of the second particulate polymer, the amount of 1,3-butadiene was changed to 15 parts and the amount of styrene was changed to 80 parts. Evaluations were conducted in the same manner as in Example 1. The results are shown in Table 1.

Comparative Example 3

A binder composition, a slurry composition, a negative electrode, a positive electrode, a separator, and a secondary battery were produced in the same way as in Example 1 with the exception that in production of the second particulate polymer, the amount of 1,3-butadiene was changed to 70 parts and the amount of styrene was changed to 25 parts. Evaluations were conducted in the same manner as in Example 1. The results are shown in Table 1.

Comparative Example 4

A binder composition, a slurry composition, a negative electrode, a positive electrode, a separator, and a secondary battery were produced in the same way as in Example 1 with the exception that only the second particulate polymer was used in production of the binder composition without using a first particulate polymer. Evaluations were conducted in the same manner as in Example 1. The results are shown in Table 1.

Comparative Example 5

A binder composition, a slurry composition, a negative electrode, a positive electrode, a separator, and a secondary battery were produced in the same way as in Example 1 with the exception that a latex of a first particulate polymer produced as described below was used instead of the natural rubber latex used in Example 1. Evaluations were conducted in the same manner as in Example 1. The results are shown in Table 1.

<Production of First Particulate Polymer>

A vessel A was charged with a mixture of 95 parts of 1,3-butadiene as an aliphatic conjugated diene monomer, 5 parts of styrene as an aromatic vinyl monomer, 0.3 parts of tert-dodecyl mercaptan as a chain transfer agent, and 0.2 parts of sodium lauryl sulfate as an emulsifier. Polymerization was initiated by starting addition of the mixture from the vessel A to a pressure vessel B and simultaneously starting addition of 1 part of potassium persulfate to the pressure vessel B as a polymerization initiator. The reaction temperature was maintained at 75° C.

Addition of the total amount of the above-described monomers was completed 5 hours and 30 minutes after the start of polymerization. Heating was subsequently performed to 85° C. and a reaction was carried out for 6 hours.

The reaction was terminated by cooling at the point at which the polymerization conversion rate reached 97% to yield a mixture containing a particulate polymer. The mixture containing the particulate polymer was adjusted to a pH of 8 through addition of 5% sodium hydroxide aqueous solution. Thereafter, unreacted monomers were removed by distillation under heating and reduced pressure. Cooling was then performed to yield a water dispersion (solid content concentration: 40%) containing styrene-butadiene copolymer (SBR) particles having a volume average particle diameter of 0.25 μm as a first particulate polymer.

Comparative Example 6

A binder composition, a slurry composition, a negative electrode, a positive electrode, a separator, and a secondary battery were produced in the same way as in Example 1 with the exception that a second particulate polymer (polyisoprene) produced as described below was used as the second particulate polymer. Evaluations were conducted in the same manner as in Example 1. The results are shown in Table 1.

<Production of Second Particulate Polymer>

Isoprene rubber (produced by Zeon Corporation; product name: Nipol IR2200) was dissolved in toluene to prepare an isoprene rubber solution of 25% in concentration.

Next, a mixture of sodium linear alkylbenzene sulfonate, sodium alkyl polyoxyethylene sulfonate, and disodium alkyl polyoxyethylene mixed in a ratio of 1:1:1 was dissolved in deionized water to produce an aqueous solution having a total solid content concentration of 2%.

A tank was charged with 500 g of the isoprene rubber solution and 500 g of the aqueous solution, and preliminary mixing of these materials was performed by stirring. Next, a metering pump was used to transfer the preliminary mixture from the tank to a Milder (produced by Pacific Machinery & Engineering Co., Ltd.; product name: MDN303V) at a rate of 100 g/minute, and the preliminary mixture was stirred at a rotation speed of 20,000 rpm to cause emulsification (phase-inversion emulsification).

Next, toluene in the resultant emulsion was removed by evaporation under reduced pressure in a rotary evaporator. The emulsion was subsequently left to separate for 1 day in a chromatographic column equipped with a stop-cock, and a lower layer portion was removed after separation to perform concentration.

Finally, an upper layer portion was filtered through a 100-mesh screen to obtain a latex containing polyisoprene (IR) particles as a second particulate polymer. The resultant polyisoprene latex had a solid content concentration of 60% and a volume average particle diameter of 1.2 μm.

Comparative Example 7

A slurry composition, a negative electrode, a positive electrode, a separator, and a secondary battery were produced in the same way as in Example 1 with the exception that a natural rubber latex (produced by Sumitomo Rubber Industries, Inc.; product name: SELATEX 5101; solid content concentration: 60%) containing natural rubber particles having a volume average particle diameter of 0.9 μm was used instead of the natural rubber latex used in Example 1 (produced by Musashino Chemical Corporation; product name: LA Type), and this natural rubber latex (produced by Sumitomo Rubber Industries, Inc.; product name: SELATEX 5101) was used as the binder composition without using a second particulate polymer. Evaluations were conducted in the same manner as in Example 1. The results are shown in Table 2.

Comparative Example 8

A slurry composition, a negative electrode, a positive electrode, a separator, and a secondary battery were produced in the same way as in Example 1 with the exception that a latex of a first particulate polymer produced as described below was used instead of the natural rubber latex used in Example 1 (produced by Musashino Chemical Corporation; product name: LA Type), and this latex of the first particulate polymer was used as the binder composition without using a second particulate polymer. Evaluations were conducted in the same manner as in Example 1. The results are shown in Table 2.
<Production of First Particulate Polymer>

A natural rubber latex (produced by Musashino Chemical Corporation; product name: LA Type) was subjected to centrifugal separation for 30 minutes at a rotation speed of 10,000 rpm using a centrifugal separator (produced by Kokusan Co., Ltd.; product name: H-2000B). Thereafter, a supernatant was collected, and protein contained in the natural rubber latex was extracted from this supernatant. The extracted protein was added to a natural rubber latex (produced by Musashino Chemical Corporation; product name: LA Type) that had not been subjected to a protein extraction operation in order to adjust the protein content to $8.0 \times 10^{-3}$ parts per 100 parts of natural rubber particles.

In Table 1, shown below:

"NR" indicates natural rubber;

"IR" indicates polyisoprene;

"BR" indicates polybutadiene;

"SBR" indicates styrene-butadiene copolymer;

"IP" indicates isoprene unit;

"BD" indicates 1,3-butadiene unit;

"ST" indicates styrene unit;

"IA" indicates itaconic acid unit; and

"2-HEA" indicates 2-hydroxyethyl acrylate unit.

TABLE 1

| | | | Example 1 | Example 2 | Example 3 | Example 4 | Example 5 | Example 6 | Example 7 | Example 8 | Example 9 | Example 10 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|---|---|---|---|---|
| Negative electrode active material | Tap density [g/cm³] | | 0.85 | 0.85 | 0.85 | 0.85 | 0.85 | 0.85 | 0.85 | 0.85 | 0.85 | 0.85 | 0.85 | 0.85 | 0.85 | 0.85 | 0.85 | 0.85 |
| Binder composition | Amount [parts by mass] | | 95.6 | 95.6 | 95.6 | 95.6 | 95.6 | 95.6 | 95.6 | 95.6 | 95.6 | 95.6 | 95.6 | 95.6 | 95.6 | 95.6 | 95.6 | 95.6 |
| | First particulate polymer | Type | NR (LA Type) ≥95 | IR | BR | NR (LA Type*¹) ≥95 | NR (LA Type) ≥95 | NR (LA Type) ≥95 | NR (LA Type) ≥95 | NR (LA Type) ≥95 | NR (LA Type) ≥95 | NR (LA Type) ≥95 | NR (LA Type*¹) ≥95 | NR (LA Type) ≥95 | NR (LA Type) ≥95 | — | SBR | NR (LA Type) ≥95 |
| | | Make-up Aliphatic conjugated diene monomer units IP [mass %] | — | 100 | — | — | — | — | — | — | — | — | — | — | — | — | — | — |
| | | BD [mass %] | — | — | 100 | — | — | — | — | — | — | — | — | — | — | — | 95 | — |
| | | Other monomer units ST [mass %] | — | — | — | — | — | — | — | — | — | — | — | — | — | — | 5 | — |
| | | Volume average particle diameter [μm] | 0.9 | 1.2 | 1.1 | 2.3 | 0.9 | 0.9 | 0.9 | 0.9 | 0.9 | 0.9 | 3.0 | 0.9 | 0.9 | — | 0.25 | 0.9 |
| | Second particulate polymer | Make-up Aliphatic conjugated diene monomer units BD [mass %] | 33 | 33 | 33 | 33 | 24 | 53 | 33 | 33 | 33 | 33 | 33 | 15 | 70 | 33 | 33 | — |
| | | IP [mass %] | — | — | — | — | — | — | — | — | — | — | — | — | — | — | — | 100 |
| | | Aromatic vinyl monomer units ST [mass %] | 62 | 62 | 62 | 62 | 71 | 42 | 62 | 62 | 62 | 62 | 62 | 80 | 25 | 62 | 62 | — |

TABLE 1-continued

| | Example 1 | Example 2 | Example 3 | Example 4 | Example 5 | Example 6 | Example 7 | Example 8 | Example 9 | Example 10 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|---|---|---|
| Optional monomer units IA [mass %] | 4 | 4 | 4 | 4 | 4 | 4 | 4 | 4 | 4 | 4 | 4 | 4 | 4 | 4 | 4 | — |
| 2-HEA [mass %] | 1 | 1 | 1 | 1 | 1 | 1 | 1 | 1 | 1 | 1 | 1 | 1 | 1 | 1 | 1 | — |
| Volume average particle diameter [μm] | 0.15 | 0.15 | 0.15 | 0.15 | 0.15 | 0.15 | 0.09 | 0.35 | 0.15 | 0.15 | 0.15 | 0.15 | 0.15 | 0.15 | 0.15 | 1.2 |
| Protein content [×10$^{-3}$ parts by mass/100 parts by mass of first particulate polymer] | 3.0 | 0 | 0 | 2.4 | 3.0 | 3.0 | 3.0 | 3.0 | 3.0 | 3.0 | 2.5 | 3.0 | 3.0 | 0 | 0 | 3.0 |
| Compounding ratio (first particulate polymer/second particulate polymer) | 70/30 | 70/30 | 70/30 | 70/30 | 70/30 | 70/30 | 70/30 | 70/30 | 55/45 | 90/10 | 70/30 | 70/30 | 70/30 | 0/100 | 70/30 | 70/30 |
| Amount (in terms of solid content) [parts by mass] | 2.2 | 2.2 | 2.2 | 2.2 | 2.2 | 2.2 | 2.2 | 2.2 | 2.2 | 2.2 | 2.2 | 2.2 | 2.2 | 2.2 | 2.2 | 2.2 |
| Protein content in slurry composition [×10$^{-6}$ parts by mass/100 parts by mass of solid content] | 46 | 0 | 0 | 30 | 46 | 46 | 46 | 46 | 36 | 59 | 31 | 46 | 46 | 0 | 0 | 46 |
| Evaluation Slurry stability | A | B | B | B | A | A | B | A | B | B | B | A | A | B | B | A |
| Peel strength | A | B | B | B | B | A | A | B | B | B | B | C | C | D | D | C |
| Cycle characteristics | A | B | B | B | A | B | A | B | A | A | D | C | C | D | D | C |

*1 Supernatant removal

TABLE 2

| | | | | | Example 11 | Example 12 | Example 13 | Example 14 | Comparative Example 7 | Comparative Example 8 |
|---|---|---|---|---|---|---|---|---|---|---|
| Negative electrode active material | | Tap density [g/cm³] | | | 0.85 | 0.85 | 0.85 | 0.85 | 0.85 | 0.85 |
| | | Amount [parts by mass] | | | 95.6 | 95.6 | 95.6 | 95.6 | 95.6 | 95.6 |
| Binder composition | First particulate polymer | Type | | | NR (LA Type*²) | NR (SELATEX 1101) | NR (LA Type*³) | NR (LA Type) | NR (SELATEX 5101) | NR *3 (LA Type) |
| | | Make-up | Aliphatic conjugated diene monomer units | IP [mass %] | ≥95 | ≥95 | ≥95 | ≥95 | ≥95 | ≥95 |
| | | | | BD [mass %] | — | — | — | — | — | — |
| | | | Other monomer units | ST [mass %] | — | — | — | — | — | — |
| | | Volume average particle diameter [µm] | | | 2.1 | 0.85 | 0.9 | 0.9 | 0.9 | 0.9 |
| | Second particulate polymer | Make-up | Aliphatic conjugated diene monomer units | BD [mass %] | 33 | 33 | 33 | 60 | — | — |
| | | | | IP [mass %] | — | — | — | — | — | — |
| | | | Aromatic vinyl monomer units | ST [mass %] | 62 | 62 | 62 | 35 | — | — |
| | | | Optional monomer units | IA [mass %] | 4 | 4 | 4 | 4 | — | — |
| | | | | 2-BEA [mass %] | 1 | 1 | 1 | 1 | — | — |
| | | Volume average particle diameter [µm] | | | 0.15 | 0.15 | 0.15 | 0.15 | — | — |
| | | Protein content [×10⁻³ parts by mass/100 parts by mass of first particulate polymer] | | | 3.0 | 0.68 | 4.8 | 3.0 | 0.2 | 8.0 |
| | | Compounding ratio (first particulate polymer/second particulate polymer) | | | 70/30 | 70/30 | 70/30 | 70/30 | 100/0 | 100/0 |
| | | Amount (in terms of solid content) [parts by mass] | | | 2.2 | 2.2 | 2.2 | 2.2 | 2.2 | 2.2 |
| | | Protein content in slurry composition [×10⁻⁶ parts by mass/100 parts by mass of solid content] | | | 46 | 10.5 | 74 | 46 | 4 | 176 |
| Evaluation | | Slurry stability | | | A | B | A | A | D | A |
| | | Peel strength | | | B | A | A | A | C | A |
| | | Cycle characteristics | | | B | A | B | B | C | D |

*2 Supernatant removal and protein addition performed
*3 Protein addition performed It can be seen from Tables 1 and 2 that it was possible to obtain a negative electrode having excellent peel strength and a secondary battery having excellent cycle characteristics in Examples 1 to 14 in which a first particulate polymer including an aliphatic conjugated diene monomer unit in a proportion of more than 90 mass % and having a volume average particle diameter of at least 0.6 µm and not more than 2.5 µm and a second particulate polymer including an aliphatic conjugated diene monomer unit in a proportion of at least 20 mass % and not more than 60 mass % and having a volume average particle diameter of at least 0.01 µm and not more than 0.5 µm were used in combination. Moreover, it can be seen from Table 1 that secondary battery cycle characteristics deteriorated in Comparative Example 1 in which a first particulate polymer was used that had a volume average particle diameter of more than 2.5 µm. Furthermore, it can be seen from Table 1 that negative electrode peel strength decreased and secondary battery cycle characteristics deteriorated in Comparative Examples 2 and 3 in which a second particulate polymer was used that had an aliphatic conjugated diene monomer unit percentage content outside of the above-described range, Comparative Example 4 in which only a second particulate polymer was used, Comparative Example 5 in which a first particulate polymer was used that had a volume average particle diameter of less than 0.6 µm, and Comparative Example 6 in which a second particulate polymer was used that had a volume average particle diameter of more than 0.5 µm and an aliphatic conjugated diene monomer unit percentage content outside of the above-described range. Also, it can be seen from Table 2 that secondary battery cycle characteristics deteriorated in Comparative Examples 7 and 8 in which only a first particulate polymer was used.

INDUSTRIAL APPLICABILITY

According to this disclosure, it is possible to provide a binder composition for a non-aqueous secondary battery electrode and a slurry composition for a non-aqueous secondary battery electrode that are capable of forming an electrode for a non-aqueous secondary battery that has excellent peel strength and can cause a non-aqueous secondary battery to display excellent cycle characteristics.

Moreover, according to this disclosure, it is possible to provide an electrode for a non-aqueous secondary battery that has excellent peel strength and can cause a non-aqueous secondary battery to display excellent cycle characteristics.

Furthermore, according to this disclosure, it is possible to provide a non-aqueous secondary battery having excellent battery characteristics such as cycle characteristics.

The invention claimed is:
1. A binder composition for a non-aqueous secondary battery electrode comprising:
   a first particulate polymer including an aliphatic conjugated diene monomer unit in a proportion of more than 90 mass % and having a volume average particle diameter of at least 0.6 µm and not more than 2.5 µm; and
   a second particulate polymer including an aliphatic conjugated diene monomer unit in a proportion of at least 20 mass % and not more than 60 mass % and having a volume average particle diameter of at least 0.01 µm and not more than 0.5 µm.
2. The binder composition for a non-aqueous secondary battery electrode according to claim 1, wherein
   the second particulate polymer further includes an aromatic vinyl monomer unit in a proportion of at least 10 mass % and not more than 70 mass %.

3. The binder composition for a non-aqueous secondary battery electrode according to claim 1, wherein the first particulate polymer is natural rubber.

4. The binder composition for a non-aqueous secondary battery electrode according to claim 3, further comprising a protein, wherein the protein has a content of at least $4.0 \times 10^{-4}$ parts by mass and not more than $5.0 \times 10^{-3}$ parts by mass per 100 parts by mass of the first particulate polymer.

5. The binder composition for a non-aqueous secondary battery electrode according to claim 1, wherein the first particulate polymer has a content of at least 20 mass % and not more than 90 mass % relative to total content of the first particulate polymer and the second particulate polymer.

6. A slurry composition for a non-aqueous secondary battery electrode comprising:

an electrode active material; and the binder composition for a non-aqueous secondary battery electrode according to claim 1.

7. The slurry composition for a non-aqueous secondary battery electrode according to claim 6, wherein the electrode active material has a tap density of 1.1 g/cm$^3$ or less.

8. An electrode for a non-aqueous secondary battery comprising an electrode mixed material layer formed using the slurry composition for a non-aqueous secondary battery electrode according to claim 6.

9. A non-aqueous secondary battery comprising:

a positive electrode;

a negative electrode;

an electrolysis solution; and a separator, wherein at least one of the positive electrode and the negative electrode is the electrode for a non-aqueous secondary battery according to claim 8.

* * * * *